A. STEINBACH.
JUICE EXTRACTING PRESS.
APPLICATION FILED AUG. 28, 1912.
1,128,732.   Patented Feb. 16, 1915.
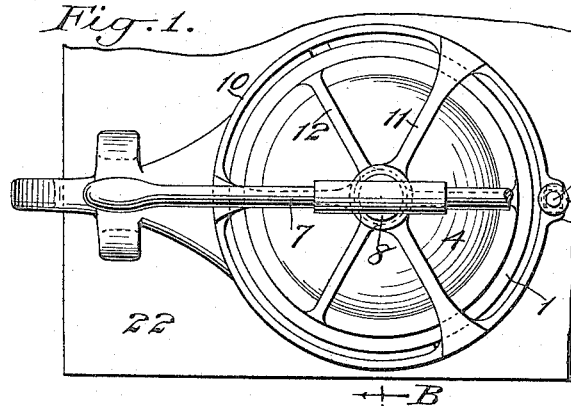
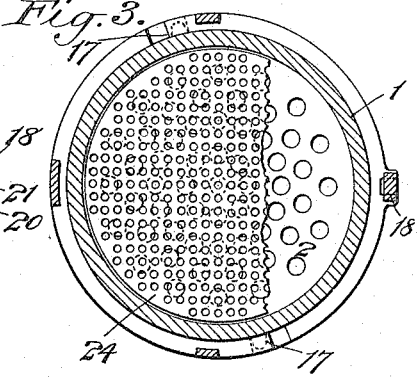
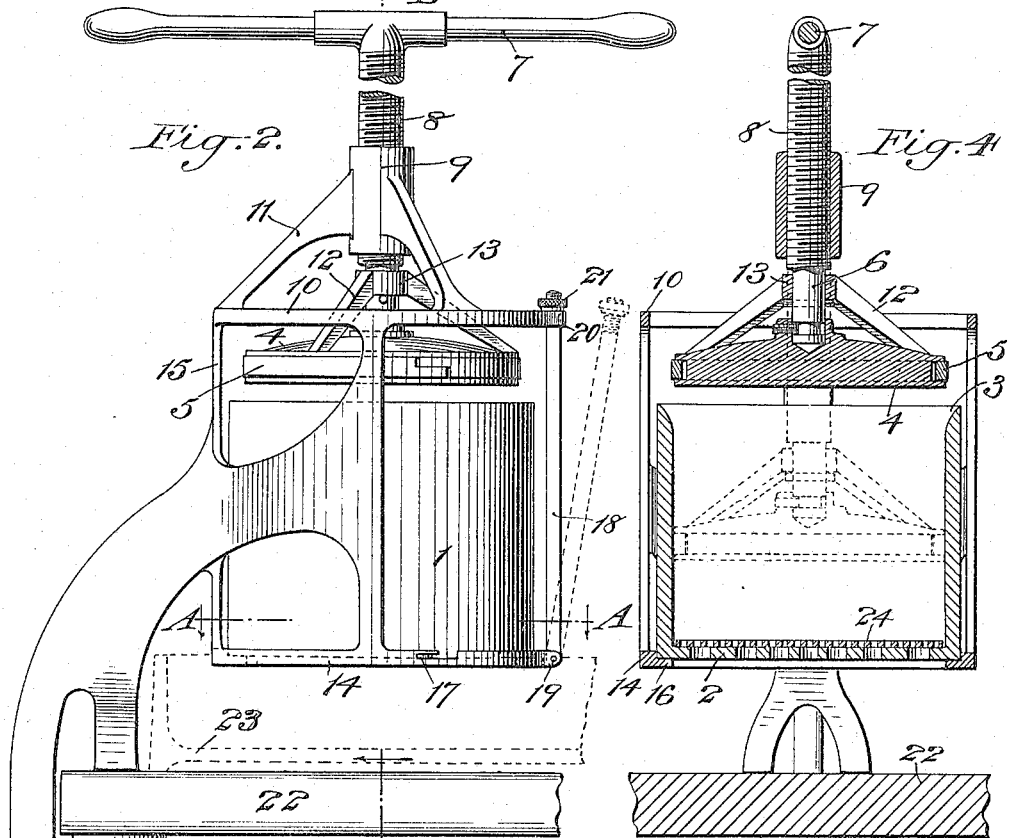
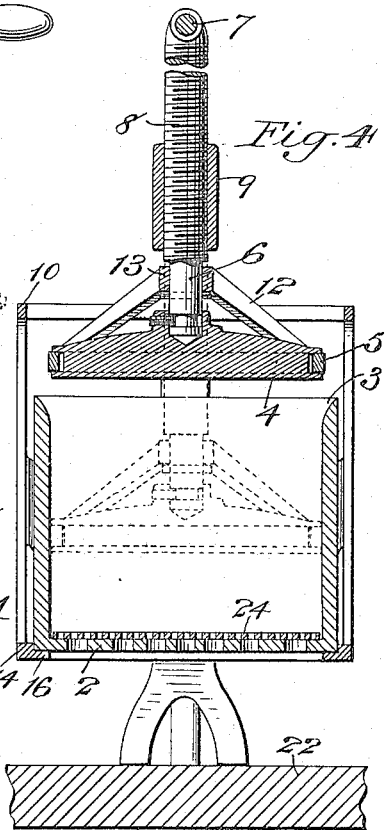
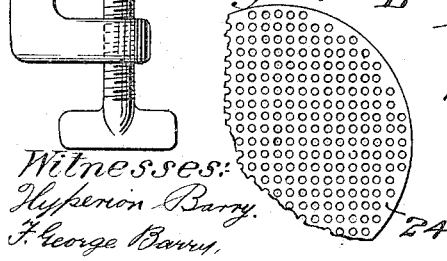
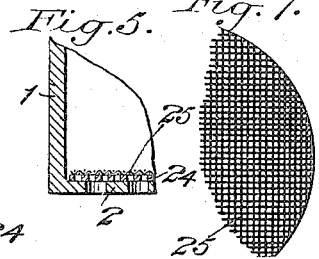
Witnesses:
Hyperion Barry.
F. George Barry.
Inventor:
Adolph Steinbach
by his attorneys

UNITED STATES PATENT OFFICE.

ADOLPH STEINBACH, OF LONG BRANCH, NEW JERSEY.

JUICE-EXTRACTING PRESS.

1,128,732.     Specification of Letters Patent.     Patented Feb. 16, 1915.

Application filed August 28, 1912. Serial No. 717,490.

*To all whom it may concern:*

Be it known that I, ADOLPH STEINBACH, a citizen of the United States, and resident of Long Branch, in the county of Monmouth and State of New Jersey, have invented a new and useful Improvement in Juice-Extracting Presses, of which the following is a specification.

The object of my invention is to provide certain improvements in the construction, form and arrangement of the several parts of a press used for extracting juices from meats, fruits, etc.

A practical embodiment of the invention is represented in the accompanying drawings, in which, Figure 1 represents the press in top plan applied to a table or other support. Fig. 2 is a view in side elevation of the press. Fig. 3 is a section taken in the plane of the line A—A of Fig. 2. Fig. 4 is a section taken in the plane of the line B—B of Fig. 2. Fig. 5 is a detail view showing a plurality of perforated false bottoms in position on the perforated bottom of the jar. Fig. 6 is a detail plan view of one of the perforated false bottoms, and Fig. 7 is a similar view of another of the perforated false bottoms.

1 designates a jar having a perforated bottom 2, the perforations being of considerable size. The parallel inner walls of the jar are made flaring at the top, as shown at 3, to facilitate the entrance of the plunger to be immediately described. The plunger 4 is provided with a packing ring 5 arranged to snugly engage the inner walls of the jar 1, so as to absolutely prevent the escape of juices past the plunger as the plunger is being forced down toward the bottom 2 of the jar, for the purpose of extracting the juices from the material contained in the jar. This plunger 4 is connected to the shank 6 of a hand screw, the cross handle of which is denoted by 7. This shank 6 has a screw-threaded portion 8 which extends through a screw-threaded sleeve 9 of a holder for the jar. This sleeve 9 is supported from the top ring 10 of the holder by ribs 11. The plunger 4 is reinforced by ribs 12 connecting the plunger with a sleeve 13 surrounding the plain portion of the shank of the hand screw. The bottom ring 14 of the holder is connected to the top ring 10 by ribs 15, leaving room for the ready insertion and removal of the jar 1. The bottom ring 14 is provided with a seat 16 upon which the bottom of the jar rests when in position, and the jar may be held against vertical movement when the plunger 4 is being withdrawn therefrom, as for instance, by providing the jar with a bayonet joint connection 17, to the said bottom ring 14. A swinging bar 18 is hinged at 19 to the lower ring 14, and is removably engaged with the top ring 10 and held in such engagement between ears 20, by a clamp nut 21. The holder for the jar and the plunger may be provided with means for clamping it to a table or other support 22, with the bottom ring 14 spaced a sufficient distance above said table or other support to permit the insertion of a pan or other receptacle 23 beneath the jar 1.

To render the press suitable for extracting juices from various material, I provide a plurality of false bottoms arranged to be inserted into the jar 1, on top of the perforated bottom 2. In the present instance, I have shown two of these perforated false bottoms 24 and 25, the false bottom 24 having perforations smaller than the bottom 2 of the jar and the false bottom 25 having perforations smaller than the false bottom 24. Either one or both of these false bottoms may be used or they need not be used at all, thereby giving a wide range of utility to the press.

While I have shown the press as being provided with two of these perforated false bottoms, it is to be understood that any number of false bottoms may be used and that the press can be used without said false bottoms.

What I claim is:

A juice extracting press comprising a jar having a flaring mouth, a perforated bottom formed integral therewith, a false perforated bottom for use in connection therewith, a plunger arranged to coact with the jar, said plunger being provided with a packing ring arranged to engage the inner walls of the jar for preventing the escape of juices past the plunger, a framework holder for said jar and plunger provided with a seat upon which the bottom of said jar rests and means for locking the jar to the holder against vertical movement consisting of a pin and slot engagement between the jar and the holder.

In testimony, that I claim the foregoing as my invention, I have signed my name in presence of two witnesses, this twenty-seventh day of August 1912.

ADOLPH STEINBACH.

Witnesses:
F. GEORGE BARRY,
OTTO W. HOLMGREN.

Copies of this patent may be obtained for five cents each, by addressing the "Commissioner of Patents, Washington, D. C."